US011673523B2

(12) United States Patent
Turner et al.

(10) Patent No.: US 11,673,523 B2
(45) Date of Patent: *Jun. 13, 2023

(54) ACCESSORY SUPPORT SYSTEMS AND METHODS FOR LANDSCAPING EQUIPMENT

(71) Applicants: Richard Turner, Shiloh, NC (US); Carolyn Turner, Shiloh, NC (US)

(72) Inventors: Richard Turner, Shiloh, NC (US); Carolyn Turner, Shiloh, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 17/480,647

(22) Filed: Sep. 21, 2021

(65) Prior Publication Data

US 2022/0073024 A1    Mar. 10, 2022

Related U.S. Application Data

(63) Continuation of application No. 16/823,992, filed on Mar. 19, 2020, now Pat. No. 11,135,990.

(60) Provisional application No. 62/822,577, filed on Mar. 22, 2019.

(51) Int. Cl.
*B60R 21/13* (2006.01)
*A01D 34/00* (2006.01)

(52) U.S. Cl.
CPC .......... *B60R 21/131* (2013.01); *A01D 34/001* (2013.01); *B60R 2021/134* (2013.01)

(58) Field of Classification Search
CPC ............ B60R 21/131; B60R 2021/134; A01D 34/001; A01D 75/008
See application file for complete search history.

(56) References Cited

U.S. PATENT DOCUMENTS

| | | | |
|---|---|---|---|
| 4,247,030 | A | 1/1981 | Amacker |
| D364,140 | S | 11/1995 | Gustavsen |
| D378,080 | S | 2/1997 | Walters et al. |
| 8,215,049 | B2 | 7/2012 | Schuchman |
| 8,608,201 | B2 | 12/2013 | Lovett |
| 9,744,911 | B2 | 8/2017 | Mobley et al. |
| 10,426,081 | B2 | 10/2019 | Biers, Sr. |
| 10,899,284 | B2 * | 1/2021 | Descoteaux ............ B60R 11/06 |
| 2005/0205628 | A1 | 9/2005 | Lehmann |
| 2007/0181759 | A1 | 8/2007 | Young |
| 2007/0262108 | A1 * | 11/2007 | Columbia ................ B60R 9/06 224/519 |

(Continued)

*Primary Examiner* — James A English
*Assistant Examiner* — Kurtis Nielson
(74) *Attorney, Agent, or Firm* — Ambrose, Mills & Lazarow, PLLC

(57) ABSTRACT

A method of using a support accessory rack includes aligning a first mounting portion of the support accessory rack with a first pin of a rollover protective structure. The method includes aligning a second mounting portion of the support accessory rack with a second pin of a second rollover protective structure. The method includes actuating the first pin to secure the first mounting portion to the rollover protective structure. The method further includes actuating the second pin to secure the second mounting portion to the rollover protective structure. The method includes pivoting a rotating support member of the support accessory rack away from the first mounting portion and the second mounting portion, and supporting the rotating support member onto a lateral bar of the rollover protective structure.

20 Claims, 16 Drawing Sheets

(56) References Cited

U.S. PATENT DOCUMENTS

| | | |
|---|---|---|
| 2008/0041904 A1 | 2/2008 | Price et al. |
| 2013/0076015 A1 | 3/2013 | Lovett |
| 2014/0144961 A1 | 5/2014 | Hill |
| 2017/0095076 A1 | 4/2017 | O'Keefe et al. |
| 2018/0208124 A1 | 7/2018 | Bray |
| 2018/0257468 A1 | 9/2018 | Cook |
| 2019/0126876 A1 | 5/2019 | Mayefske et al. |
| 2019/0291677 A1 | 9/2019 | Ajam et al. |

\* cited by examiner

ACCESSORY SUPPORT SYSTEMS AND METHODS FOR LANDSCAPING EQUIPMENT

RELATED APPLICATIONS

This patent application is a continuation of U.S. application Ser. No. 16/823,992, filed on Mar. 19, 2020, entitled "ACCESSORY SUPPORT SYSTEMS AND METHODS FOR LANDSCAPING EQUIPMENT," which claims benefit of priority to U.S. Provisional Application No. 62/822,577, filed on Mar. 22, 2019, entitled "ACCESSORY SUPPORT SYSTEM FOR LANDSCAPING EQUIPMENT," each of which is incorporated herein by reference in its entirety.

BACKGROUND

The embodiments described herein relate to attachments and accessory support systems and methods for landscaping equipment. More particularly, the embodiments described herein relate to support systems that can be easily mounted to existing structures on commercial mowers.

Known landscaping, construction, and farming equipment includes accessory mounting systems to which various accessories can be attached. For example, some known equipment includes support systems to which accessories, such as weed trimmers, lights, buckets, spray tanks, and supplies can be mounted or supported. Many known support systems, however, have to be permanently attached to the mower. Other known support systems can be temporarily attached to the landscaping equipment, but procedures for temporary mounting are time consuming, cumbersome, and/or unattractive. For example, installation and removal of known support systems often requires tools (e.g., wrenches), extra fasteners, or the like, which are often not readily available when installation or removal is required. Additionally, such additional tools and components can be easily lost or damaged, adding cost and complexity to the use of such known support systems. Moreover, such known support systems are also not interchangeable between various types of equipment and/or require separate fasteners and tools for mounting.

Thus, a need exists for an accessory support system that is sturdy, durable, visually attractive, does not have to be permanently attached, and can quickly be attached and detached from landscaping equipment, as needed.

SUMMARY

This summary introduces certain aspects of the embodiments described herein to provide a basic understanding. This summary is not an extensive overview of the inventive subject matter, and it is not intended to identify key or critical elements or to delineate the scope of the inventive subject matter.

In some embodiments, a support apparatus includes a first side support member with a first end portion and a second end portion. The first end portion of the first side support member includes a first mounting portion for insertion into a first hinge opening of a rollover protective structure of a landscaping equipment. The first mounting portion defines a first pin opening for receiving a first mounting pin to secure the first mounting portion to the rollover protective structure. A second side support member has a first end portion and a second end portion. The first end portion of the second side support member includes a second mounting portion for insertion into a second hinge opening of the rollover protective structure. The second mounting portion defines a second pin opening for receiving a second mounting pin to secure the second mounting portion to the rollover protective structure. The support apparatus includes a lateral support member that is coupled to the first side support member and the second side support member. The support apparatus includes a platform member coupled onto one or more of the first side support member, the second side support member, or the lateral support member. The support apparatus includes a rotating support member with a first end portion and a second end portion. The first end portion of the rotating support member is rotatably coupled to the lateral support member. The second end portion of the rotating support member is operable to be coupled onto a portion of the rollover protective structure. The rotating support member is operable to transmit a load applied on the platform member to the rollover protective structure.

In some embodiments, a method of using a support accessory rack includes aligning a first mounting portion of the support accessory rack with a first pin of a rollover protective structure. The first pin is secured to a first hinge portion of the rollover protective structure. The method includes aligning a second mounting portion of the support accessory rack with a second pin of a second rollover protective structure. The second pin is secured to a second hinge portion of the rollover protective structure. The method includes actuating the first pin to secure the first mounting portion to the rollover protective structure. The method further includes actuating the second pin to secure the second mounting portion to the rollover protective structure.

Other accessory support systems, related components, and/or methods according to embodiments will be or become apparent to one with skill in the art upon review of the following drawings and detailed description. It is intended that all such additional accessory support systems and methods be within the scope of this disclosure.

DETAILED DESCRIPTION

The embodiments described herein can advantageously be used in landscaping, construction, and farming equipment to provide additional storage, support, and mounting points for accessory devices and equipment. The embodiments described herein can be easily mounted to and/or removed from a conventional landscaping machine (e.g., mower) without the need for hand tools or other mounting accessories.

As used herein, the term "about" when used in connection with a referenced numeric indication means the referenced numeric indication plus or minus up to 10 percent of that referenced numeric indication. For example, the language "about 50" covers the range of 45 to 55. Similarly, the language "about 5" covers the range of 4.5 to 5.5.

As used herein, specific words chosen to describe one or more embodiments and optional elements or features are not intended to limit the invention. For example, spatially relative terms—such as "beneath", "below", "lower", "above", "upper", "proximal", "distal", and the like—may be used to describe the relationship of one element or feature to another element or feature as illustrated in the figures. These spatially relative terms are intended to encompass different positions (i.e., translational placements) and orientations (i.e., rotational placements) of a device in use or operation in addition to the position and orientation shown in the figures. For example, if a device in the figures is turned over, elements described as "below" or "beneath" other elements or features would then be "above" or "over" the other elements or features. Thus, the term "below" can encompass both positions and orientations of above and below. A device may be otherwise oriented (e.g., rotated 90 degrees or at other orientations) and the spatially relative descriptors used herein interpreted accordingly. Likewise, descriptions of movement along (translation) and around (rotation) various axes includes various spatial device positions and orientations.

Similarly, geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

In addition, the singular forms "a", "an", and "the" are intended to include the plural forms as well, unless the context indicates otherwise. The terms "comprises", "includes", "has", and the like specify the presence of stated features, steps, operations, elements, components, etc. but do not preclude the presence or addition of one or more other features, steps, operations, elements, components, or groups.

Figure 1:
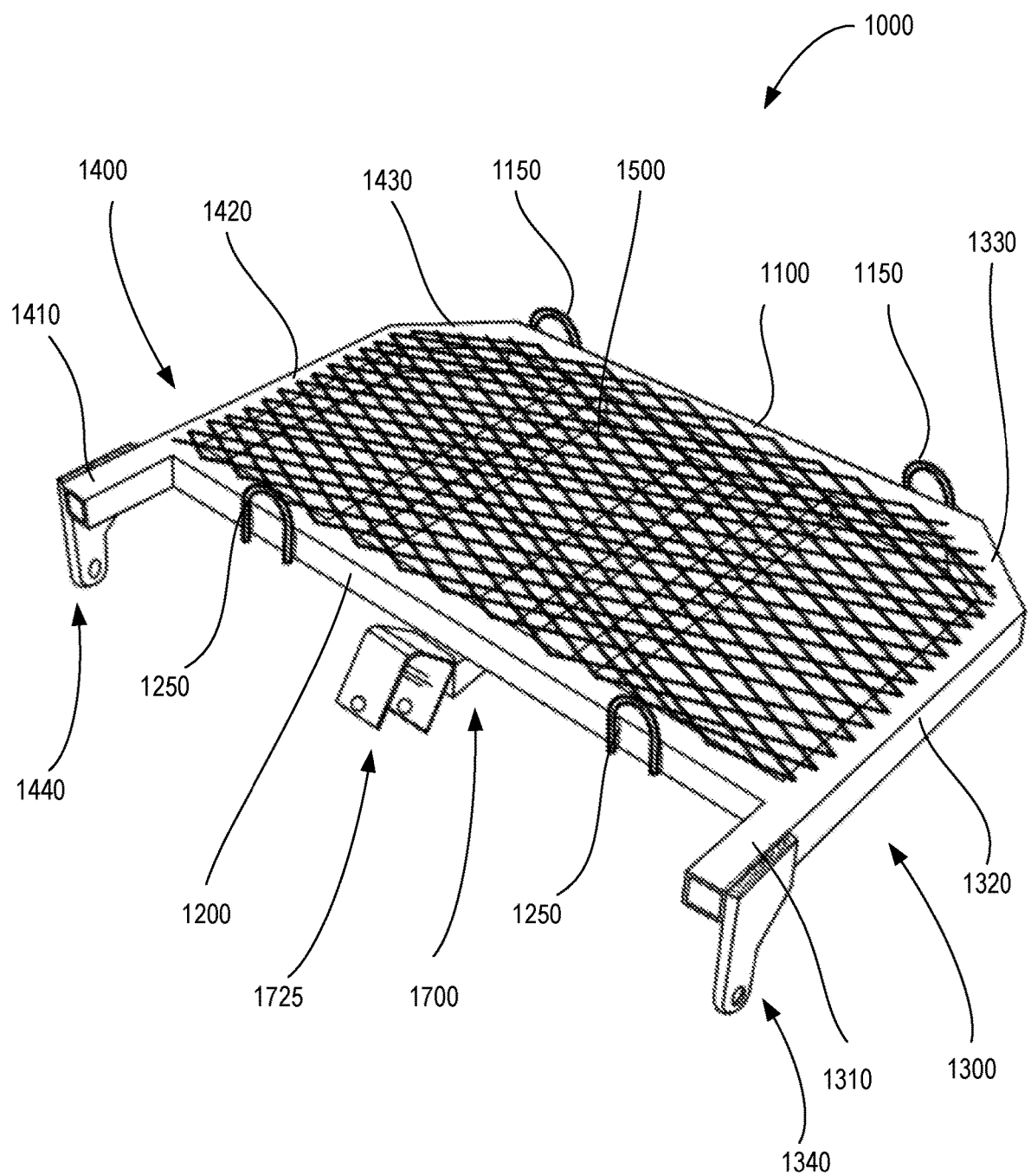
FIG. 1 is a perspective view of an accessory support system according to an embodiment.

FIG. 1 is a perspective view of an accessory support system 1000. The accessory support system 1000 (which may also be referred to as a support accessory rack) includes a first lateral support member 1100, a second lateral support member 1200, a first side support member 1300, and a second side support member 1400. In some embodiments, each of the first lateral support member 1100, the second lateral support member 1200, the first side support member 1300, and the second side support member 1400 are made of metal tubes. In some embodiments, the first lateral support member 1100, the second lateral support member 1200, the first side support member 1300, and the second side support member 1400 are steel tubes with a 7 gauge to 20 gauge thickness. In some embodiments, one or more of the first lateral support member 1100, the second lateral support member 1200, the first side support member 1300, and the second side support member 1400 are 16 gauge steel tubes. In some embodiments, the tubes are made of one or more of carbon steel or stainless steel. In some embodiments, a cross section of the tubes are circular, oval, triangular, or rectangular. In some embodiments, one or more of the first lateral support member 1100, the second lateral support member 1200, the first side support member 1300, and the second side support member 1400 are solid rods or beams.

Figure 2:
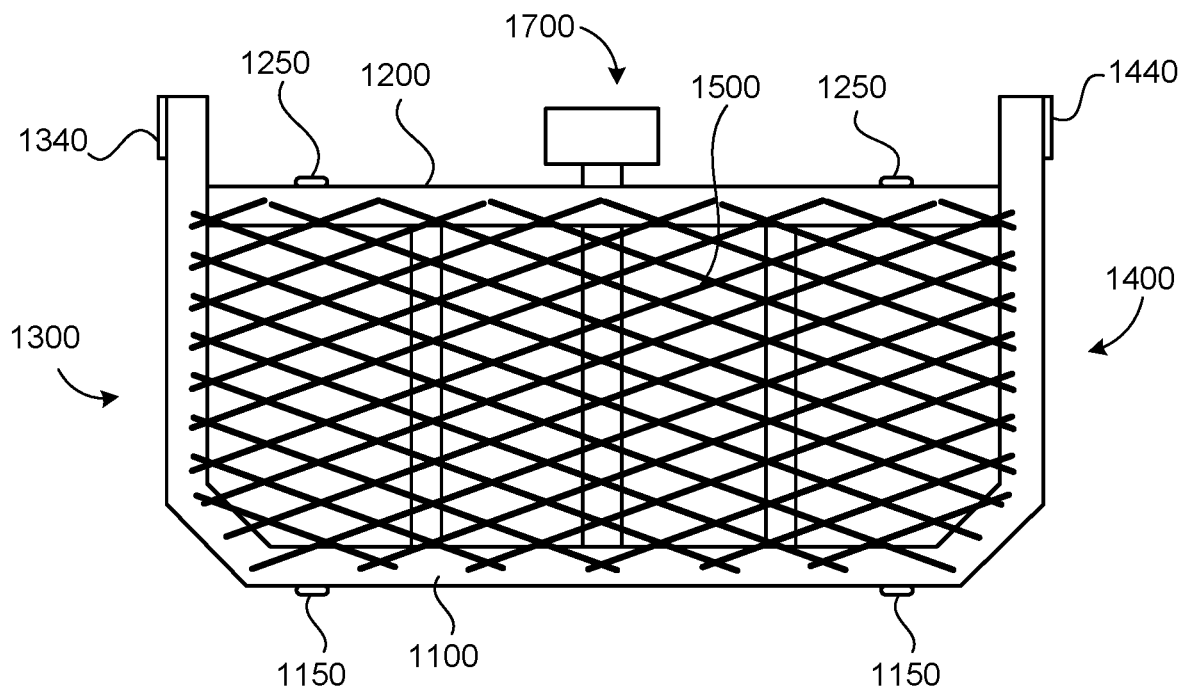
FIG. 2 is a top view of the accessory support system of FIG. 1.
Figure 3:
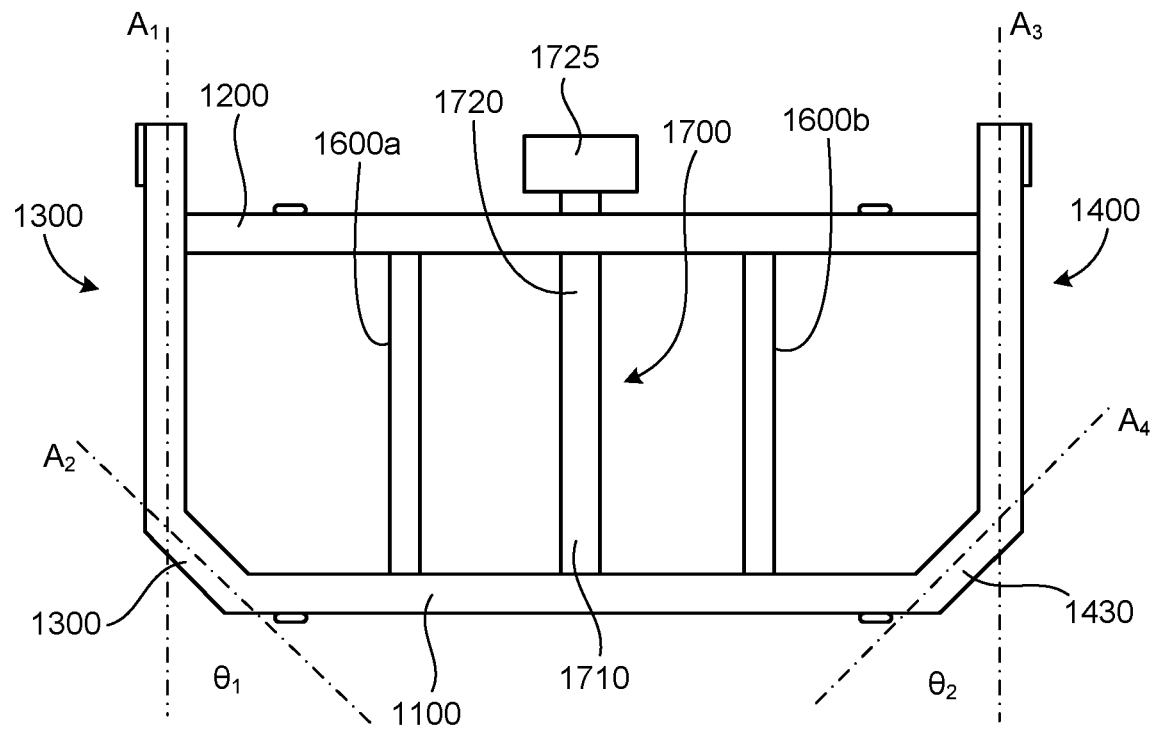
FIG. 3 is a partial top view of the accessory support system of FIG. 1 with mesh platform hidden.

As shown in FIGS. 2 and 3, the first side support member 1300 includes a first end portion 1310, a central portion 1320, and a second end portion 1330. The central portion 1320 extends along a first axis $A_1$ and the second end portion 1330 extends along a second axis $A_2$ different from the first axis $A_1$. The first axis $A_1$ and the second axis $A_2$ define a first offset angle $\theta_1$. In some embodiments, the first offset angle $\theta_1$ is between 0 degrees and 90 degrees. In some embodiments, the first offset angle $\theta_1$ is between about 25 degrees and 75 degrees. In some embodiments, the first offset angle $\theta_1$ is between about 35 degrees to 65 degrees.

The second side support member 1400 includes a first end portion 1410, a central portion 1420, and a second end portion 1430. The central portion 1420 extends along a third axis $A_3$ and the second end portion 1430 extends along a fourth axis $A_4$ different from the first axis $A_3$. The third axis $A_3$ and the fourth axis $A_4$ define a second offset angle $\theta_2$. In some embodiments, the second offset angle $\theta_2$ is between 0 degrees and 90 degrees. In some embodiments, the second offset angle $\theta_2$ is between about 25 degrees and 75 degrees. In some embodiments, the second offset angle $\theta_2$ is between about 35 degrees to 65 degrees. The lengths of the second end portions 1330, 1430 and the offset angles $\theta_1$, $\theta_2$ can be selected to follow or stay within an overall footprint of a mower or other landscaping equipment for which the accessory support system 1000 is intended to be mounted to, as described in greater detail below.

As shown, the first lateral support member 1100 extends from the second end portion 1330 of the first side support member 1300 to the second end portion 1430 of the second side support member 1400. The second lateral support member 1200 extends from the first end portion 1310 of the first side support member 1300 to the second end portion 1410 of the second side support member 1400. The accessory support system 1000 further includes a platform member 1500 that extends within at least a perimeter defined by the first lateral support member 1100, the second lateral support member 1200, the first side support member 1300, and the second side support member 1400. As shown, the platform member 1500 is a metal grate structure. It will be appreciated that the platform member 1500 can be made of any suitable material, including but not limited to, wood, plastic, composites, and the like. In some embodiments, the platform member 1500 may include one or more of a solid surface, a mesh surface, and or a woven surface.

As shown in FIG. 3, the accessory support system 1000 includes a first cross support member 1600a and a second cross support member 1600b. Each of the first cross support member 1600a and the second cross support member 1600b extends from the first lateral support member 1100 and the second lateral support member 1200. The first cross support member 1600a and the second cross support member 1600b may provide the accessory support system 1000 with increased torsional rigidity and load bearing capabilities. For example, the first cross support member 1600a and the second cross support member 1600b are configured to support downward forces applied by the platform member 1500. It will be appreciated that the accessory support system 1000 can include additional cross support members, or need not include any cross support members depending on the type of platform member 1500 selected or depending on the intended use of the accessory support system 1000. As shown in FIGS. 1-3 the first lateral support member 1100 includes first anchor portions 1150 and the second lateral support members 1200 includes second anchor portions 1250. The first and second anchor portions 1150, 1250 are configured to receive a hook, straps, or other attachment members to secure equipment and other objects to the platform member 1500.

Figure 4:
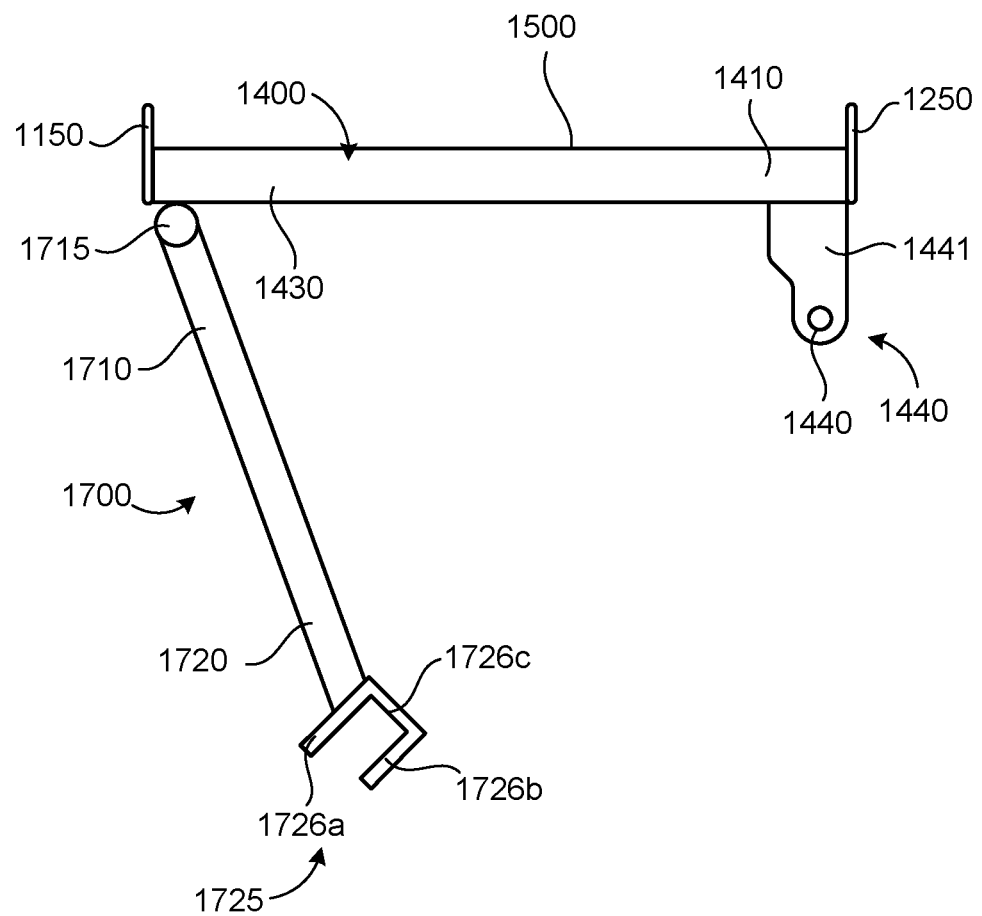
FIG. 4 is a side view of the accessory support system of FIG. 1.
Figure 5:
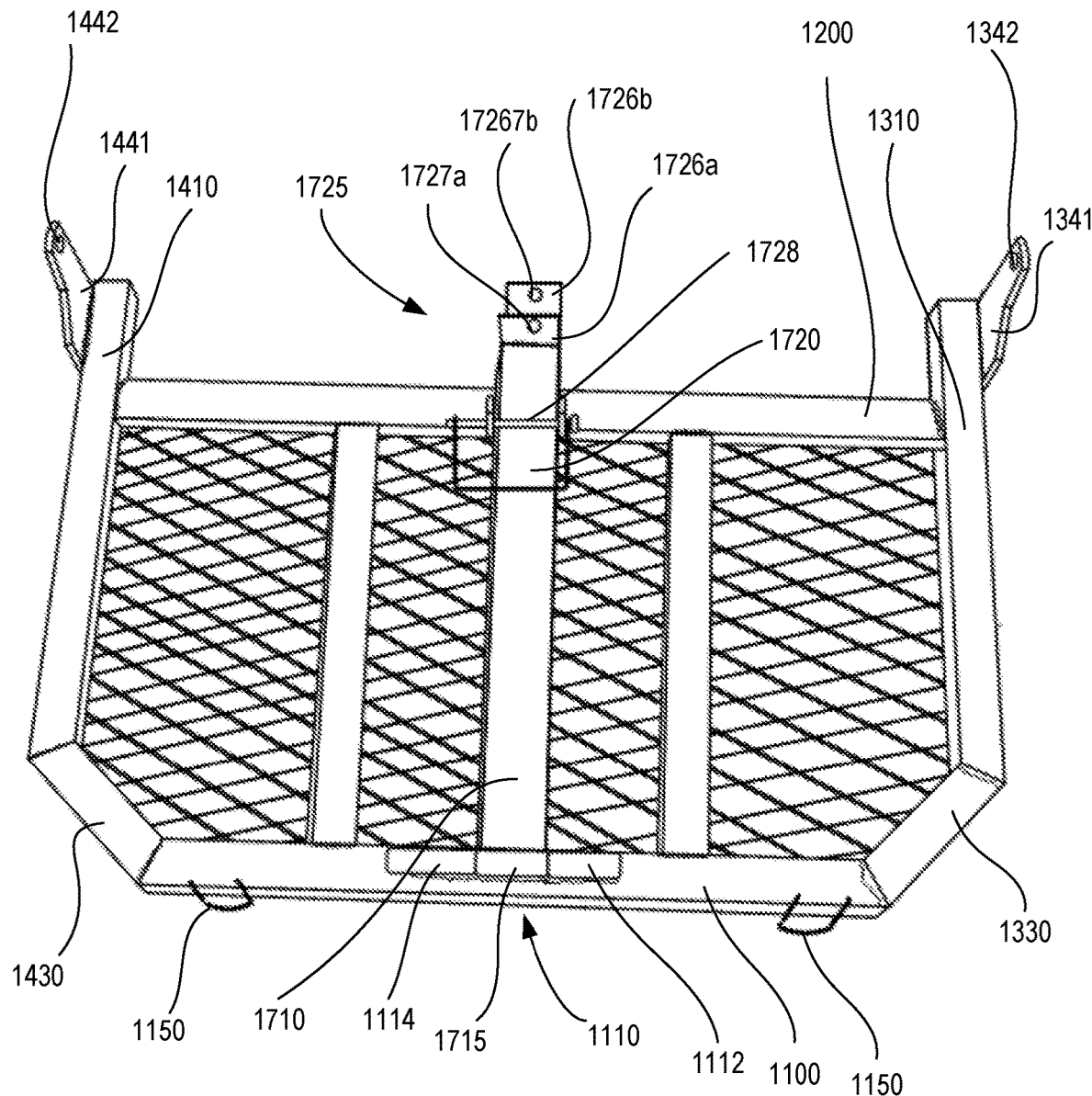
FIG. 5 is a bottom view of the accessory support system of FIG. 1.

FIG. 4 is a side view of the accessory support system 1000 and FIG. 5 is a bottom view of the accessory support system 1000. The accessory support system 1000 includes a rotating support member 1700. The first lateral support member 1100 includes a pivot 1110 configured to rotatably support the rotating support member 1700. As shown, the rotating support member 1700 includes a first end portion 1710 and a second end portion 1720. A shaft member 1715 is coupled to the first end portion 1710. For example, the shaft member 1715 is secured to the first end portion 1710 via welding. In some embodiments, the shaft member 1715 is secured to the first end portion 1710 via mechanical fasteners. The pivot 1110 includes a first bushing 1112 and a second bushing 1114 configured to rotatably support the shaft member 1715 of the first end portion 1710. In operation, the rotating support member 1700 can be rotated towards the platform member 1500 and secured in a first position (e.g., storage position). The rotating support member 1700 can be rotated away from the platform member 1500 and placed into a second position (e.g., mounting position) as will be described in further detail below. An anchor member 1725 is coupled to the second end portion 1720. For example, the anchor member 1725 is secured to the rotating support member 1700 via welding. In some embodiments, the anchor member 1725 is secured to the second end portion 1720 via mechanical fasteners. The anchor member 1725 includes a mounting face configured to at least partially surround a portion of a landscaping equipment, such as a portion of a rollover protective structure. As shown, the anchor member 1725 includes a U-shaped mounting surface 1726. In some embodiments, the anchor member 1725 may include a C-shaped or V-shaped mounting surface. It will be appreciated by one skilled in the art that other shapes and geometries may be used for securing the rotating support member 1700 to a portion of the mower.

Figure 6:
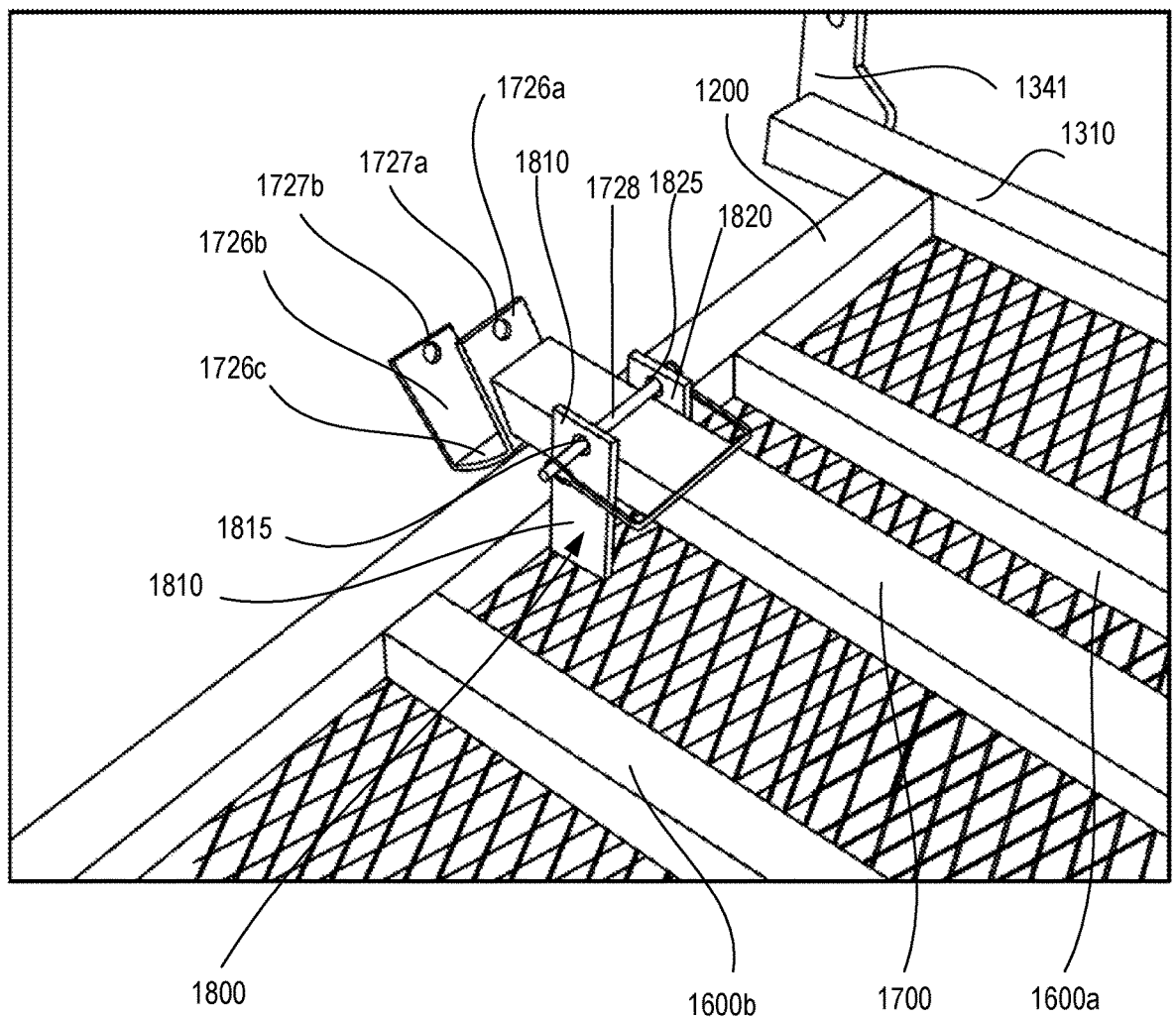
FIG. 6 is a bottom perspective view of a rotating support member of an accessory support system of FIG. 1.
Figure 7:
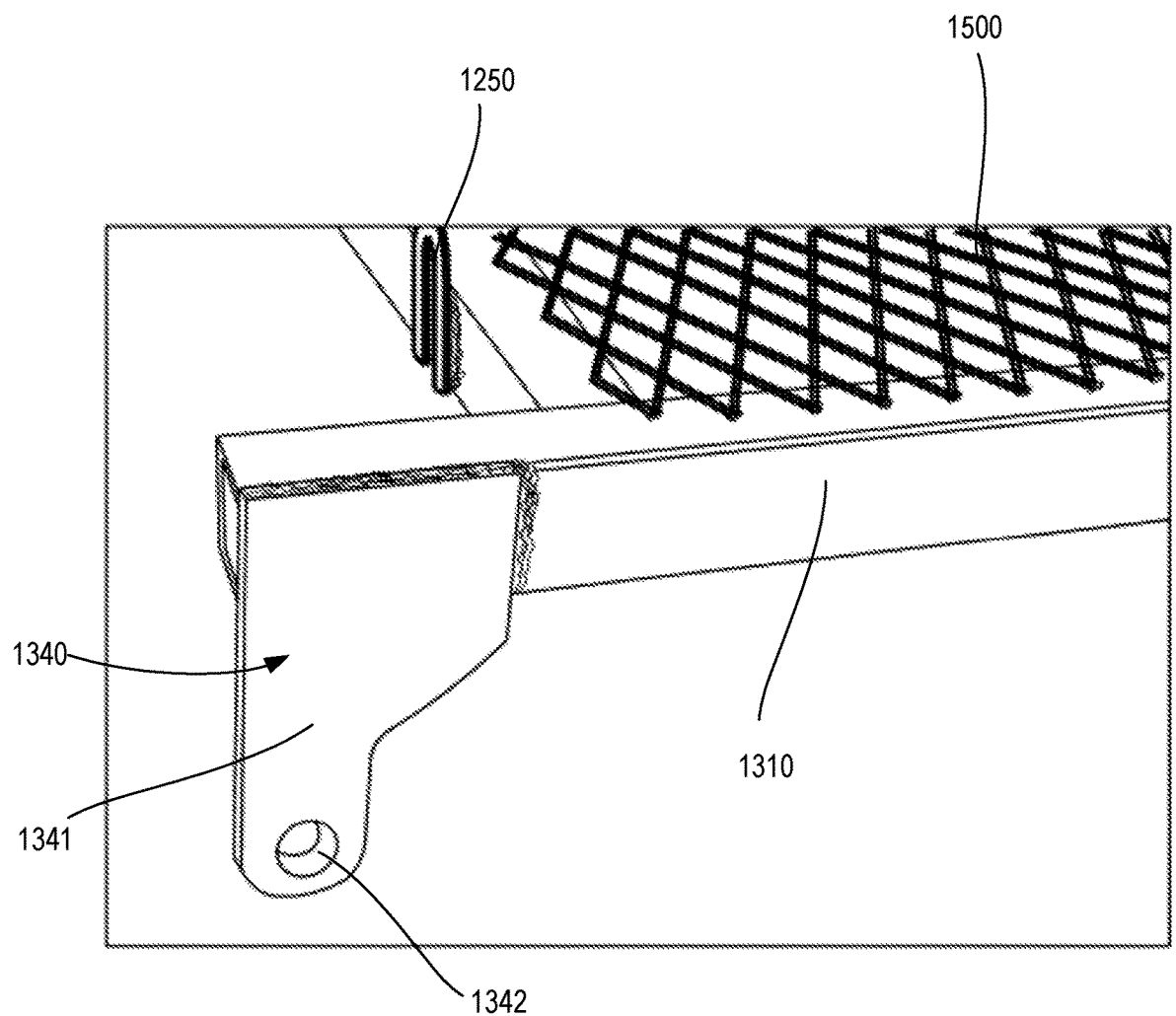
FIG. 7 is an enlarged perspective view of a mounting portion of the accessory support system of FIG. 1.

FIG. 6 is a bottom perspective view of the accessory support system 1000. As shown in FIGS. 4 and 6, the anchor member 1725 includes a first side portion 1726a, a second side portion 1726b, and a third side portion 1726c. The third side portion 1726c extends between the first side portion 1726a and the second side portion 1726b. The first side portion 1726a is further coupled to the second end portion 1720 of the rotating support member 1700. The first side portion 1726a includes a first anchor opening 1727a and the second side portion 1726b includes a second anchor opening 1727b. The first anchor opening 1727a and the second anchor opening 1727b are configured to receive an anchor pin 1728. As shown, the anchor pin 1728 is a wire snap safety pin. In some embodiments, the anchor pin 1728 can be any type of locking pin or fastener including, but not limited to, a hitch pin, a cotter pin, and a bolt/nut combination, for example.

As shown in FIGS. 1, 5, and 6 the rotating support member 1700 is in the first position (e.g., storage position) and is folded towards the platform member 1500. The accessory support system 1000 includes a storage bracket 1800 that is coupled to the second lateral support member 1200. The storage bracket 1800 includes a first bracket side 1810 and a second bracket side 1820. The first bracket side 1810 includes a first bracket opening 1815 and the second bracket side 1820 includes a second bracket opening 1825. The first bracket opening 1815 and the second bracket opening 1825 are configured to receive the anchor pin 1728. As shown in FIG. 6, when the rotating support member 1700 is placed in the first position and the anchor pin 1728 is installed through the first bracket opening 1815 and the second bracket opening 1825, the anchor pin 1728 prevents the rotating support member 1700 from rotating away from the platform member 1500. Similarly stated, when the rotating support member 1700 is in the first position and the anchor pin 1728 is installed onto the storage bracket 1800, the anchor pin secures the second end portion 1720 of the rotating support member 1700 between the first bracket side 1810 and the second bracket side 1820. Although the storage bracket is shown as being coupled to the second lateral support member 1200, in other embodiments, the storage bracket 1800 is coupled to the platform member 1500. In yet other embodiments, the storage bracket 1800 is coupled to one or more of the first cross support member 1600a or the second cross support member 1600b.

In the second position (e.g., mounting position), as generally shown in FIG. 4, the rotating support member 1700 is rotated away from the platform member 1500. In this second position, the anchor member 1725 is configured to engage and be removably coupled to a portion of the rollover protective structure.

As shown in FIGS. 5, 7, 8A, and 8B, the first side support member 1300 includes a first mounting portion 1340 and the second side support member 1400 includes a second mounting portion 1440. The first mounting portion 1340 is configured to mount to a first portion of the rollover protective structure and the second mounting portion 1440 is configured to mount to a second portion of the rollover protective structure, as will be described in greater detail below. The first mounting portion 1340 includes a first tab member 1341 extending downwardly from the first side support member 1300. The first tab member 1341 is coupled to a side surface of the first side support member 1300. The first tab member 1341 defines a first pin opening 1342 configured to receive a mounting pin. The second mounting portion 1440 includes a second tab member 1441 extending downwardly from the second side support member 1400. The second tab member 1441 is coupled to a side surface of the second side support member 1400. The second tab member 1441 defines a second pin opening 1442 configured to receive a mounting pin. The first tab member 1341 includes an interior face that faces the second mounting portion 1440. The second tab member 1441 includes an interior face that faces the first mounting portion 1340. In some embodiments, a thickness of the first tab member 1341 and the second tab member 1441 are each about 0.95 cm (⅜ inches). In some embodiments, a distance between the interior face of the first tab member 1341 and the interior face of the second tab member 1441 is about 78.11 cm (30.75 inches). In some embodiments, the first pin opening 1342 and the second pin opening 1442 are each about 1.75 cm (¹¹⁄₁₆ inches) in diameter.

Figure 8A:
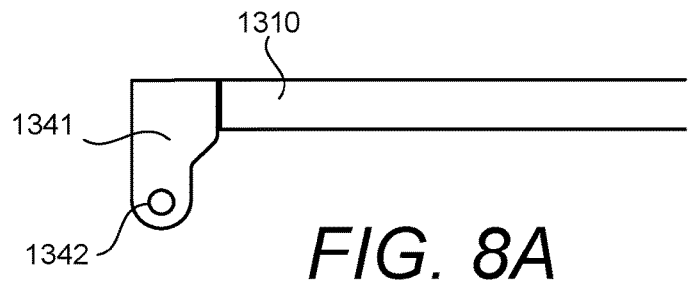
FIGS. 8A and 8B is a side view and cross-sectional view, respectively, of a mounting portion for an accessory support system according to an embodiment.
Figure 8B:
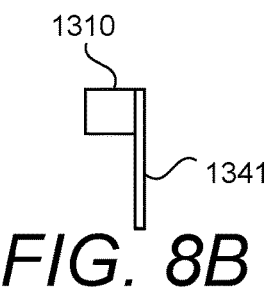
Figure 9A:
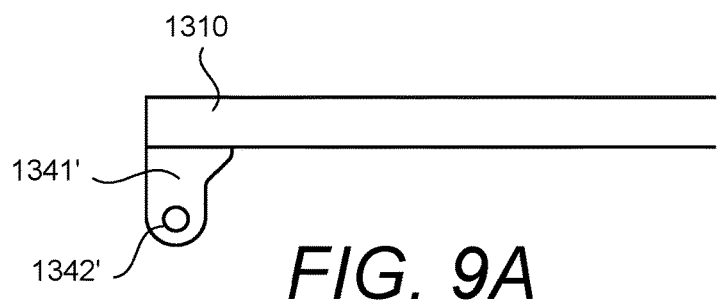
FIGS. 9A and 9B is a side view and cross-sectional view, respectively, of a mounting portion for an accessory support system according to an embodiment.
Figure 9B:
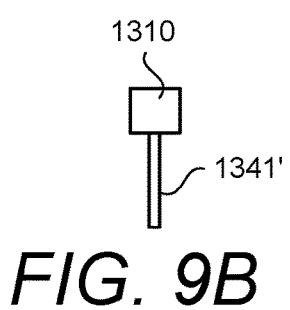

Although FIGS. 8A and 8B show the first tab member 1341 being coupled on an outboard (or outer) side of the first side support member 1300, in other embodiments, any suitable arrangement for the tabs (or other mounting structure) an be employed. The mounting tabs can be configured for mounting to a particular type of landscaping machine. As shown in FIGS. 9A and 9B, in some embodiments, the first tab member 1341' is coupled to a bottom surface of the first side support member 1300. The first tab member 1341' includes a pin opening 1342' configured to receive a mounting pin. Similarly, in some embodiments, a second tab member (not shown) is coupled to a bottom surface of the second side support member 1400. In some embodiments, the pin opening 1342' is about 1.75 cm (¹¹⁄₁₆ inches) in diameter.

Figure 10A:
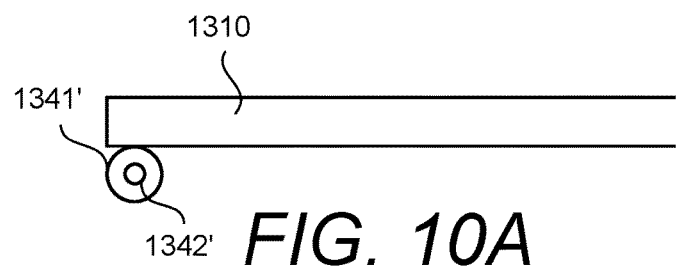
FIGS. 10A and 10B is a side view and cross-sectional view, respectively, of a mounting portion for an accessory support system according to an embodiment.
Figure 10B:
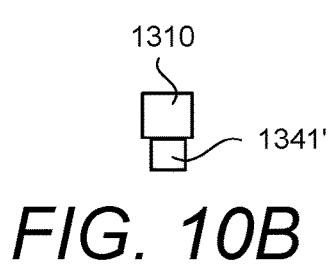

As shown in FIGS. 10A and 10B, in some embodiments, the first mounting portion 1340 includes a sleeve member 1341". The sleeve member 1341" includes a pin opening 1342" configured to receive a mounting pin. The sleeve member 1341" is coupled to a distal end of the first side support member 1300. Similarly, in some embodiments, the second mounting portion 1440 can include a second sleeve member (not shown) and the second sleeve member includes a second pin opening (not shown) configured to receive a mounting pin. In some embodiments, an outer diameter of the sleeve member 1341" is about 2.86 cm (1⅛ inches). In some embodiments, the pin opening 1342" is about 1.90 cm (¾ inches) in diameter.

Figure 11A:
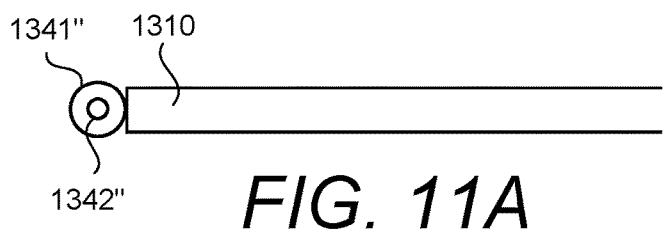
FIGS. 11A and 11B is a side view and cross-sectional view, respectively, of a mounting portion for an accessory support system according to an embodiment.
Figure 11B:
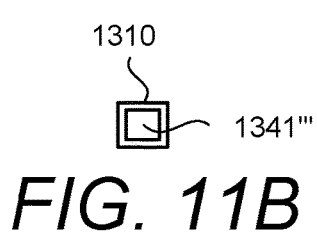

As shown in FIGS. 11A and 11B, in some embodiments, the first mounting portion 1340 includes a sleeve member 1341'''. The sleeve member 1341' includes a pin opening 1342''' configured to receive a mounting pin. The sleeve member 1341''' is coupled to a distal end of the first side support member 1300. Similarly, in some embodiments, the second mounting portion 1440 can include a second sleeve member (not shown) and the second sleeve member includes a second pin opening (not shown) configured to receive a mounting pin. In some embodiments, an outer diameter of the sleeve member 1341''' is about 2.86 cm (1⅛ inches) and the pin opening 1342' is about 1.90 cm (¾ inches in diameter. In some embodiments, an outer diameter of the sleeve member 1341''' is about 2.22 cm (⅞ inches) and the pin opening 1342''' is about 1.59 cm (⅝ inches) in diameter.

Figure 12A:
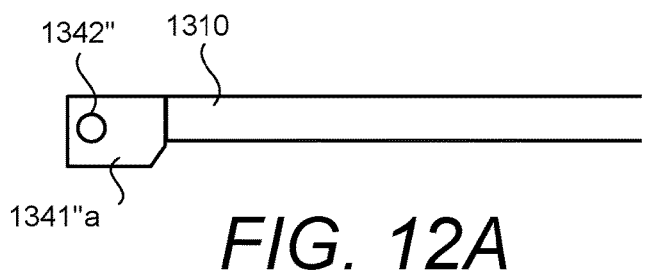
FIGS. 12A and 12B is a side view and cross-sectional view, respectively, of a mounting portion for an accessory support system according to an embodiment.
Figure 12B:
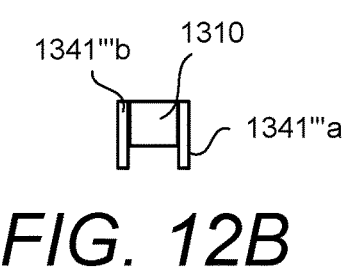

As shown in FIGS. 12A and 12B, in some embodiments, first mounting portion 1340 includes a first mounting plate 1341a and a second mounting plate 1341b. The first mounting plate 1341a is coupled to a first surface of a distal end of the first side support member 1300. The second mounting plate 1341b is coupled to a second surface of the distal end of the first side support member 1300, and the second surface is opposite of the first surface. A pin opening 1342"" extends through the first mounting plate 1341a, the distal end 1310 of the first side support member 1300 and the second mounting plate 1341b. The pin opening 1342"" is configured to receive a mounting pin. Similarly, the second mounting portion 1440 can include a first mounting plate and a second mounting plate (not shown). A second pin opening (not shown) can extend through the first mounting and second mounting plates of the second mounting portion 1440 and through a distal end of the second side support member 1400. In some embodiments, the pin opening 1342"" is about 1.59 cm (⅝ inches), about 1.75 cm (¹¹⁄₁₆ inches), or about 1.90 cm (¾ inches) in diameter.

Figure 13:
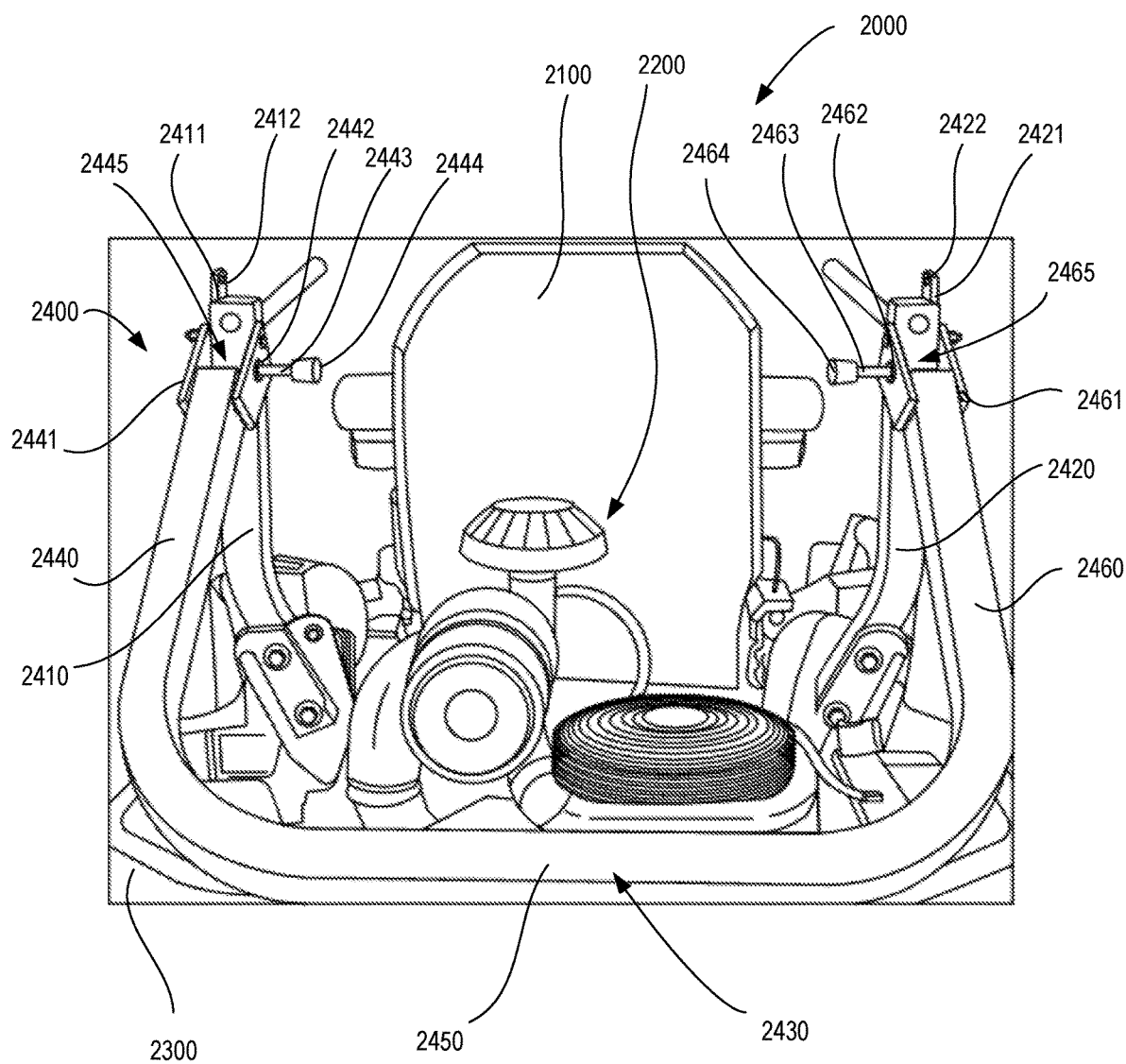
FIG. 13 is a rear view of a landscaping machine with a rollover protection structure to which an accessory support system can be mounted according to an embodiment.
Figure 14A:
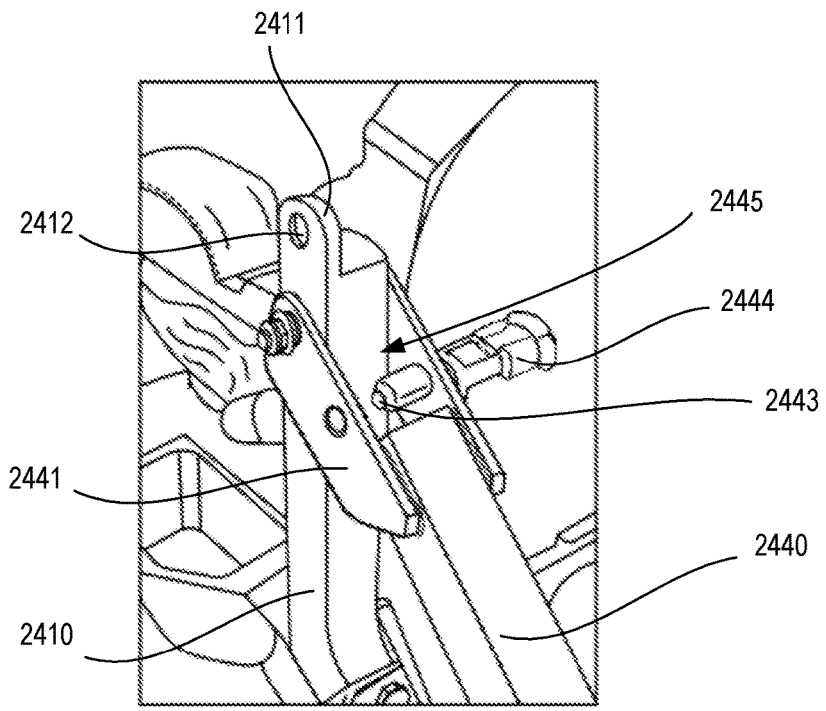
FIG. 14A is a side perspective view of a hinge and quick release mechanism of the rollover protection structure in FIG. 13 in a first quick release position.
Figure 14B:
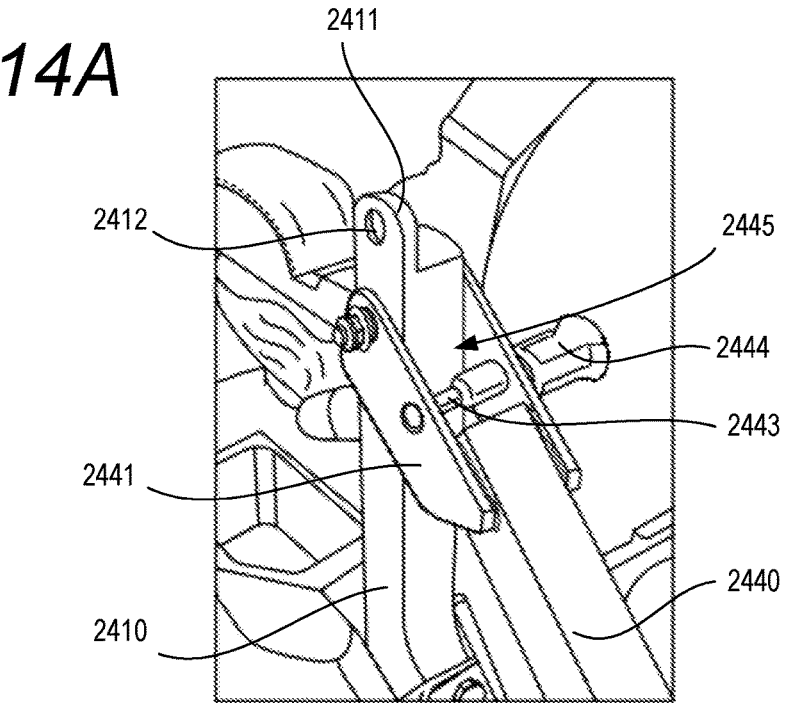
FIG. 14B is a side perspective view of the hinge and quick release mechanism of the in FIG. 14A in a second quick release position.
Figure 15A:
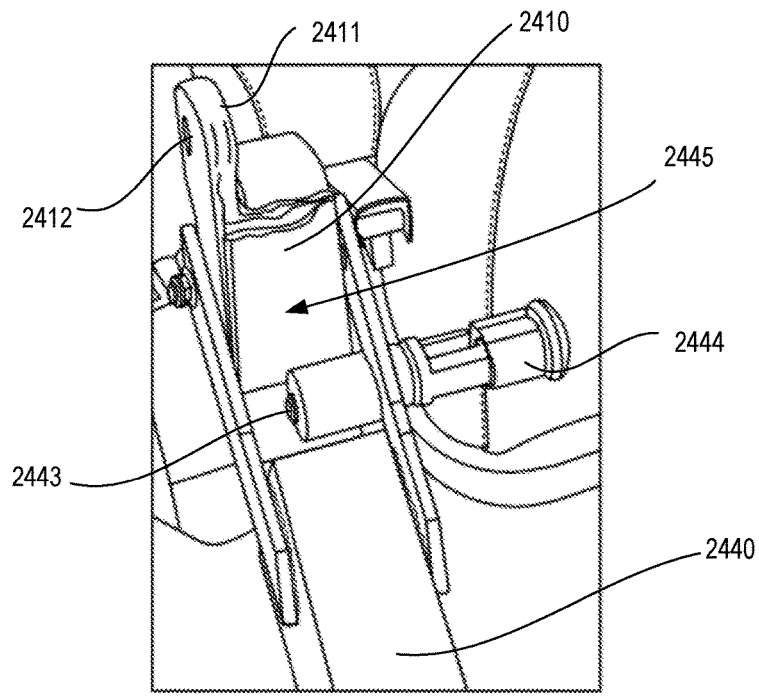
FIG. 15A is a top perspective view of a hinge and quick release mechanism of the rollover protection structure in FIG. 13 in a first quick release position.
Figure 15B:
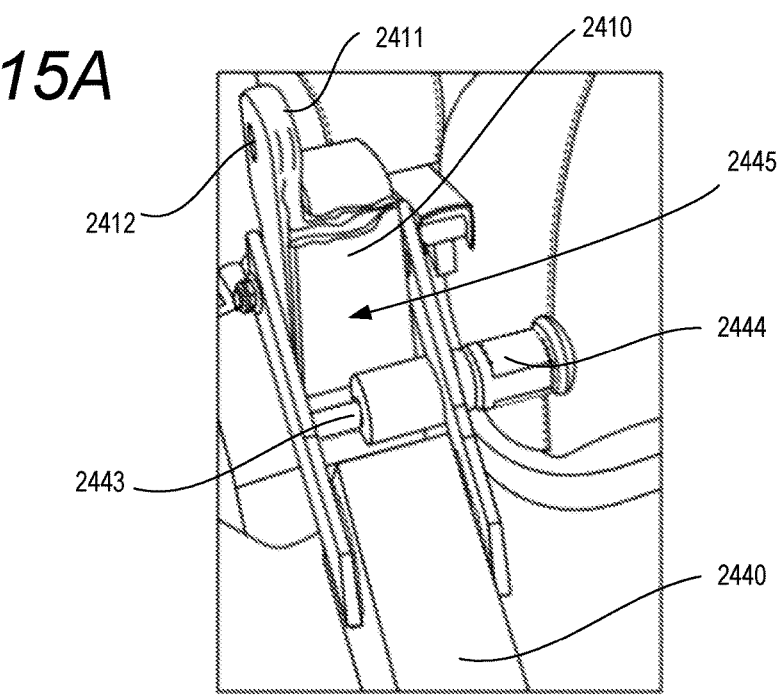
FIG. 15B is a top perspective view of the hinge and quick release mechanism of the in FIG. 15A in a second quick release position.

FIG. 13 is a rear view of a landscaping machine 2000 including an operator seat 2100, a motor 2200, a frame member 2300, and a rollover protective structure 2400 (which may also be referred to as ROPS). The rollover protective structure 2400 includes a first vertical support member 2410 and a second vertical support member 2420. The first vertical support member 2410 and the second vertical support member 2420 are coupled to the frame member 2300 of the landscaping machine 2000. The rollover protective structure 2400 further includes a rollover bar 2430 rotatably supported by the first vertical support member 2410 and the second vertical support member 2420.

The rollover bar 2430 includes a first end portion 2440, a central portion 2450, and a second end portion 2460. In some embodiments, the central portion 2450 is a lateral bar, tube or beam extending from the first end portion 2440 to the second end portion 2460. The first end portion 2440 includes a hinge portion 2441 rotatably coupled to the first vertical support member 2410. The second end portion 2460 includes a hinge portion 2461 rotatably coupled to the second vertical support member 2420. The first end portion 2440 includes a pin opening 2442 configured to receive a mounting pin. The second end portion 2460 includes a pin opening 2462 configured to receive a mounting pin.

As shown in FIG. 13, the rollover bar 2430 is arranged in a first position (e.g., retracted position) such that the rollover bar 2430 is not in use. While the accessory support system 1000 described herein is operable to mount to a landscaping machine in the retracted position, it is recommended that manufacturer warnings and recommendations be followed when operating the landscaping machine in the retracted position. The first vertical support member 2410 includes a first rollover bar mounting tab 2411 and the second vertical support member 2420 includes a second rollover bar mounting tab 2421. The first rollover bar mounting tab 2411 includes a first pin opening 2412 configured to receive a mounting pin and the second rollover bar mount tab 2421 includes a second pin opening 2422 configured to receive a mounting pin. The rollover bar 2430 can be rotated and raised to a second position (e.g., upright position)(not shown) such that the first pin opening 2412 is aligned with the pin opening 2442 of the first end portion 2440 and the second pin opening 2422 is aligned with the pin opening 2462 of the second end portion 2460. A first mounting pin 2443 is configured to be inserted through the first pin opening 2412 and the pin opening 2442. A second mounting pin 2463 is configured to be inserted through the second pin opening 2422 and the pin opening 2462 to secure the rollover bar 2430 in the second, upright position.

FIGS. 14A-15B show enlarged views of the hinge portion 2441 of first vertical support member 2410. A hinge opening 2445 is defined between the vertical support member 2410 and the first end portion 2440 of the rollover bar 2430 when the rollover bar 2430 is in the first position. Similarly, as generally shown in FIG. 13, a hinge opening 2465 is defined between the vertical support member 2420 and the second end portion 2460 of the rollover bar 2430. As shown, the first mounting pin 2443 is a quick release pin configured to actuate between an open position (FIG. 14A, FIG. 15A) and a closed position (FIG. 14B, FIG. 15B) by rotating a quick release portion 2444 about 90 degrees to extend the first mounting pin 2443. When the rollover bar 2430 is placed in the second, upright position, the first mounting pin 2443 can be actuated from the open position to the closed position to secure the first end portion 2440 of the rollover bar 2430 to the first rollover bar mounting tab 2411.

Figure 16:
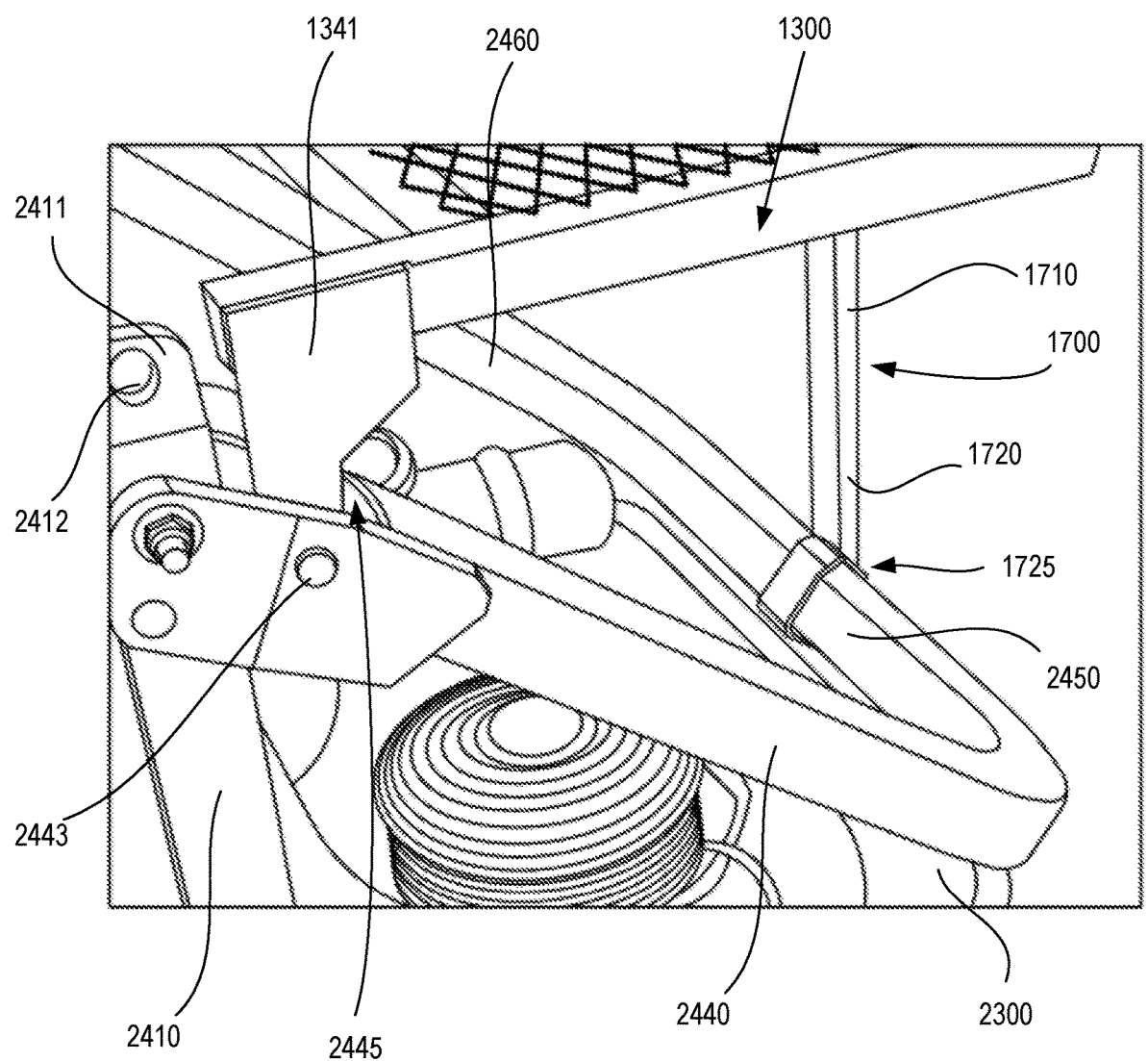
FIG. 16 is a perspective view of the accessory support system of FIG. 1 mounted on the landscaping machine of FIG. 13.
Figure 17:
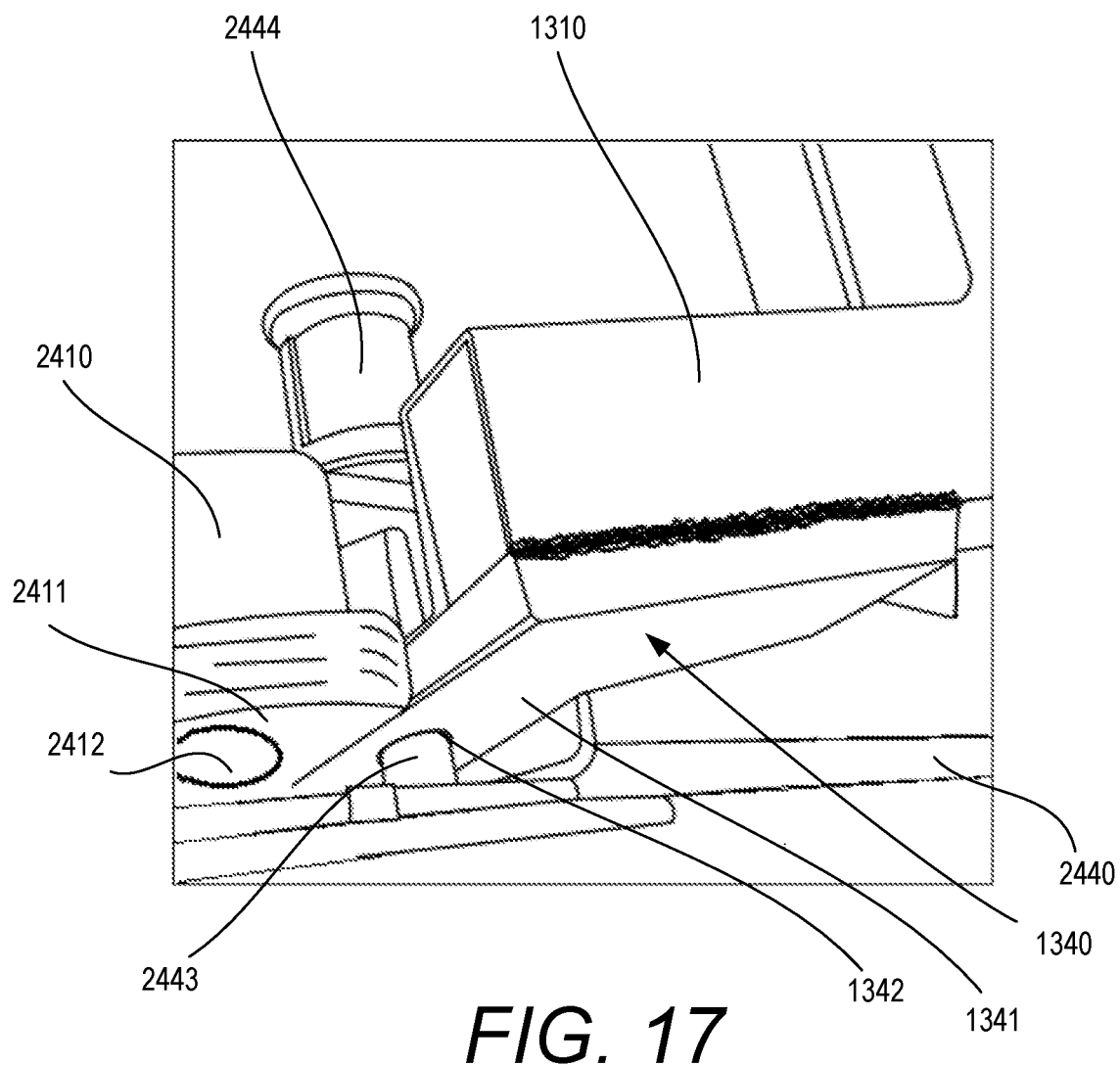
FIG. 17 is a top view of the accessory support system mounted to the rollover protection structure of the landscaping machine in FIG. 16.
Figure 18:
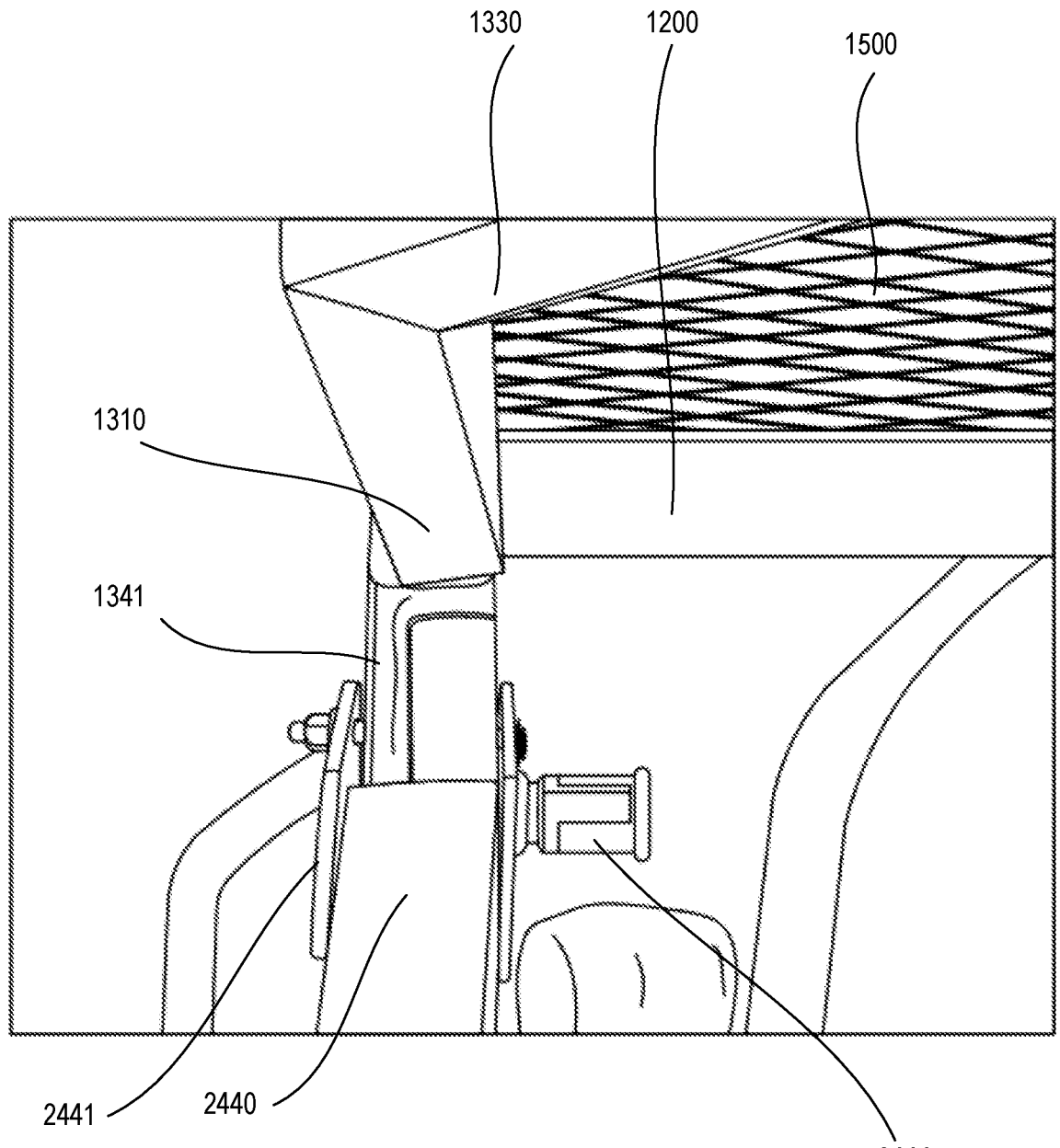
FIG. 18 is a rear side view of the accessory support system mounted to the rollover protection structure of the landscaping machine in FIG. 16.

As generally shown in FIGS. 16-18, when the rollover bar 2430 is in the first, retracted position, the hinge opening 2445 is exposed. The first tab member 1341 of the first mounting portion 1340 is configured to be aligned and inserted into the hinge opening 2445. Similarly, the second tab member 1441 of the second mounting portion 1440 is configured to be aligned and inserted into the hinge opening 2465. As described above with reference to FIGS. 14B and 15B, the mounting pins 2443, 2463 can be actuated to extend the pins to a closed position, and in doing so, the first tab member 1341 is secured to the first end portion 2440 of the rollover bar 2430 and the second tab member 1441 is secured to the second end portion 2440 of the rollover bar 2430.

Figure 19:
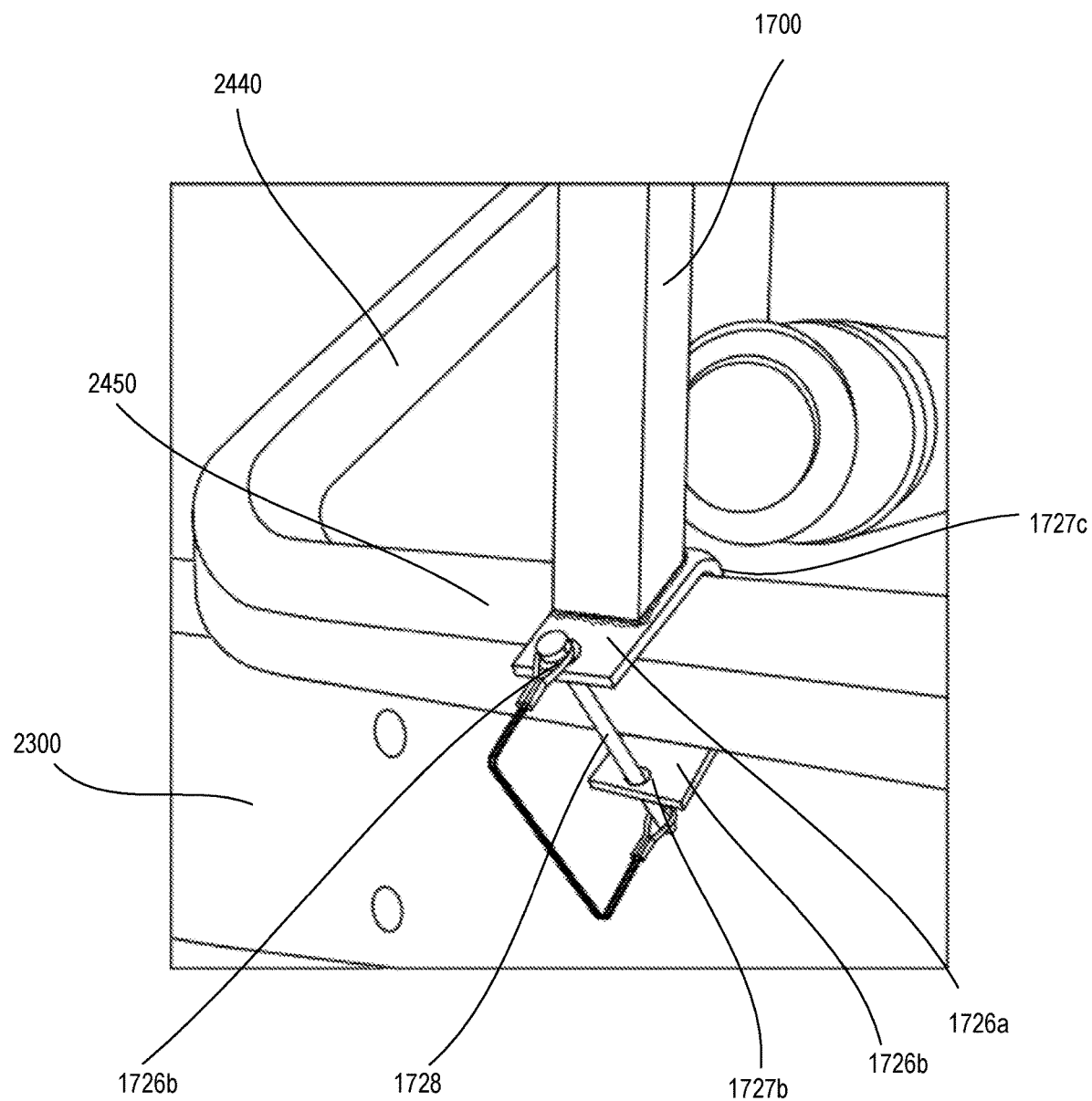
FIG. 19 is a rear perspective view of a support portion of the accessory support system mounted to the rollover protection structure of the landscaping machine in FIG. 16.

As shown in FIGS. 16 and 19, the rotating support member 1700 is operable to rotate away from the platform member 1500 to a mounting position. In the mounting position, the anchor member 1725 is mounted to the central portion 2450 of the rollover bar 2430. As shown in FIG. 19, the first side portion 1726a, the second side portion 1726b, and the third side portion 1726c at least partially surrounds the central portion 2450. In some embodiments, the anchor member 1725 is operable to mount to the frame member 2300 or other support structure of the landscaping machine 2000.

As shown in FIG. 19, the anchor pin 1728 can be inserted into and secured to the first anchor opening 1727a and the second anchor opening 1727b. When the anchor member 1725 is supported against the central portion 2450 and the anchor pin 1728 is secured within the first and second anchor openings 1727a, 1727b, the rotating support member 1700 is secured to the central portion 2450 of the rollover bar 2430. When the first tab member 1341, the second tab member 1441, and the anchor member 1725 are secured to the rollover protective structure 2400, the accessory support system 1000 is capable of carrying equipment or support accessory devices, such as a sprayer tank.

Figure 20:
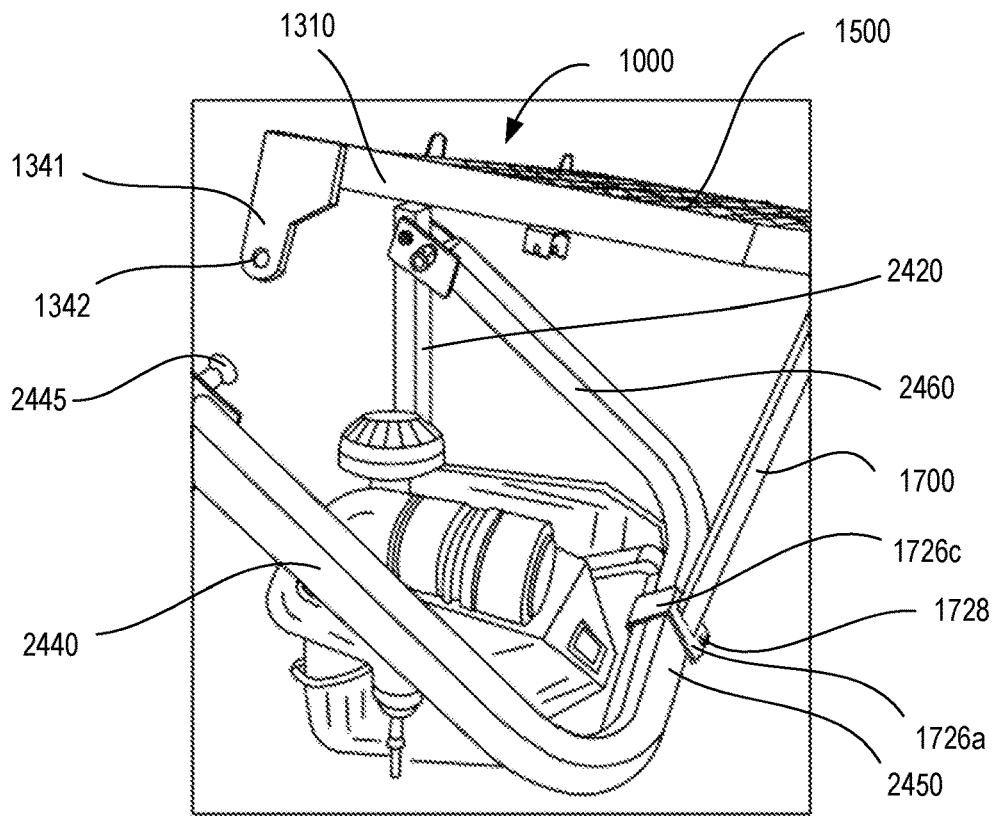
FIGS. 20 and 21 are perspective views of the accessory support system shown in FIG. 1 prior to being mounted on a landscaping machine
Figure 21:
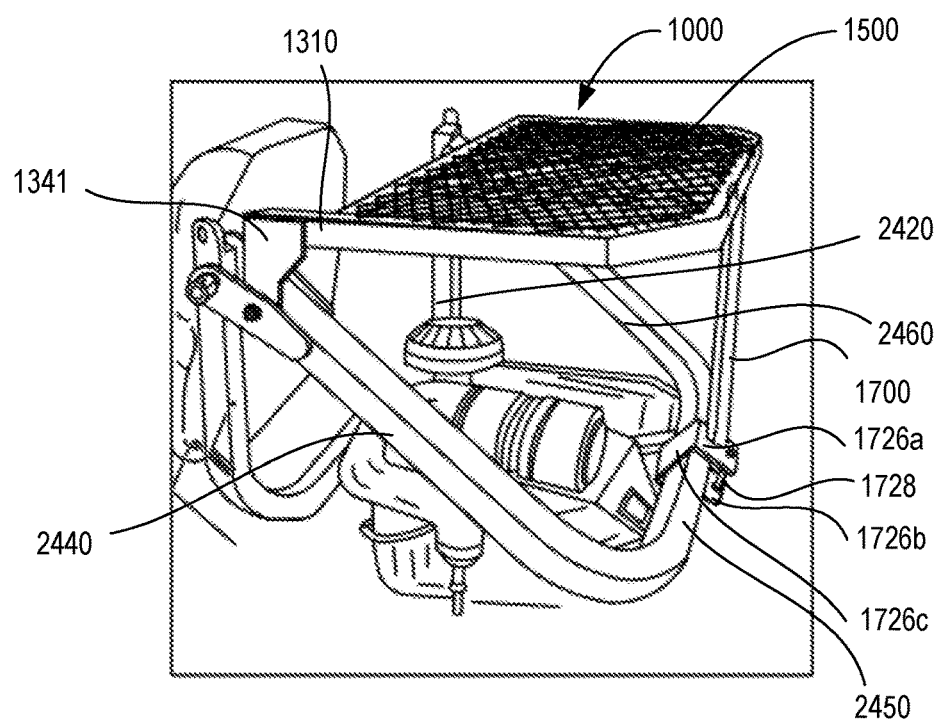
Figure 22:
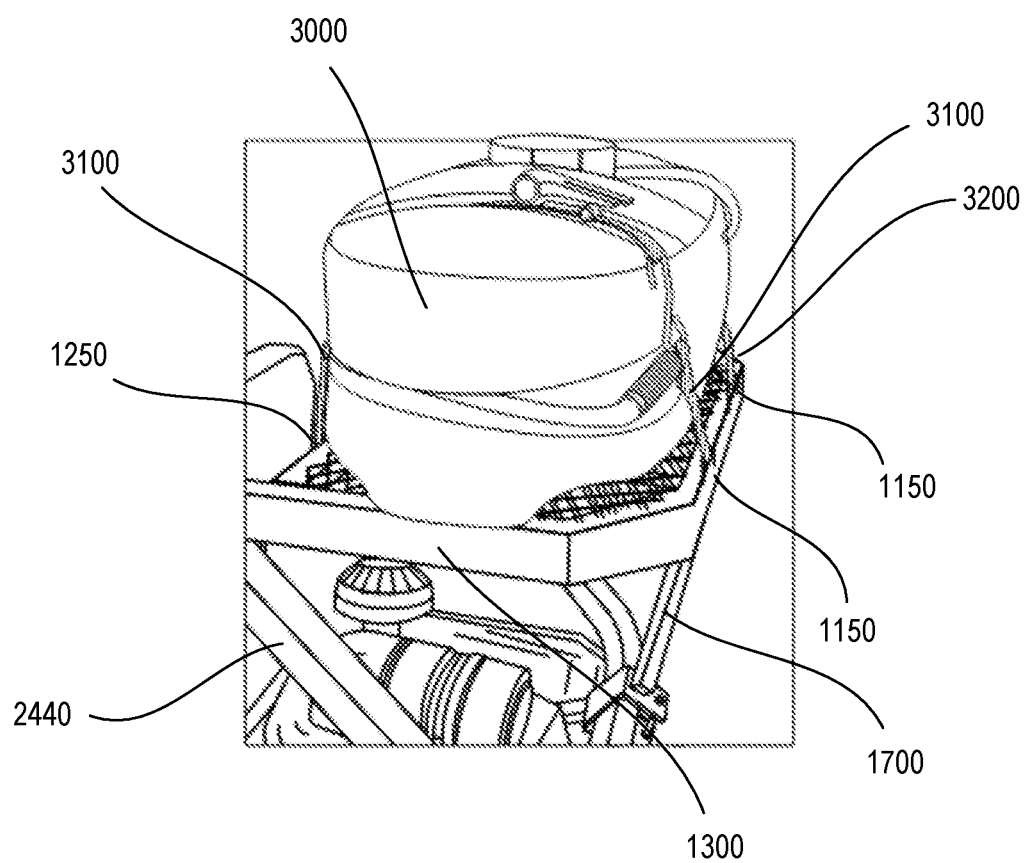
FIG. 22 is a perspective view of the accessory support system shown in FIG. 1 fully mounted to the landscaping machine and supporting an accessory mounted on a landscaping machine according to an embodiment.

With reference to FIGS. 20-22, the accessory support system 1000 can be transitioned from the first position (e.g., storage position) to the second position (e.g., mounting position) by removing anchor pin 1728 from the storage bracket 1800 and pivoting the rotating support member 1700 away from the platform member 1500. In some embodiments, the rotating support member 1700 is rotated about 30 degrees to 90 degrees away from the platform member 1500.

The first tab member 1341 of the first mounting portion 1340 is aligned with and inserted into the hinge opening 2445 and the first mounting pin 2443 is inserted through the mounting pin opening 1345 to secure the first tab member 1341 to the rollover protective structure 2400. The second tab member 1441 of the second mounting portion 1440 is aligned with and inserted into the hinge opening 2465 and the second mounting pin 2463 is inserted through the second pin opening 1442 to secure the second tab member 1441 to the rollover protective structure 2400. In some embodiments, the first tab member 1341 can be aligned with and inserted into the hinge opening 2445 and the second tab member 1441 can be aligned with and inserted into the hinge opening 2465 in a single operation or motion (i.e., substantially simultaneously).

The anchor member 1725 is pivoted towards and mounted onto the central portion 2450 of the rollover bar 2430. In particular, the first side portion 1726a, a second side portion 1726b, and a third side portion 1726c of the anchor member 1725 is oriented to at least partially surround the central portion 2450 such that the first side portion 1726a of the anchor member 1275 is about one side of the central portion 2450 and the second side portion 1726b of the anchor member 1725 is about an opposite side of the anchor member 1725. The anchor pin 1728 is inserted through the first anchor opening 1727a and the second anchor opening 1727b to lock the anchor member 1275 to the rollover bar 2430.

As shown in FIG. 22, a sprayer tank 3000 is placed on and supported by the platform member 1500 of the of the accessory support system 1000. The sprayer tank 3000 is secured to the platform member via a first strap 3100 and a second strap 3200. The first and second straps 3100, 3200 are attached to first anchor portions 1150 and the second anchor portions 1250, respectively. It will be appreciated that other equipment can be stored on or attached to the accessory support system.

All examples and illustrative references are non-limiting and should not be used to limit the claims to specific implementations and embodiments described herein and their equivalents. Where methods described above indicate certain events occurring in certain order, the ordering of certain events may be modified. Additionally, certain of the events may be performed concurrently in a parallel process when possible, as well as performed sequentially as described above. Any headings are solely for formatting and should not be used to limit the subject matter in any way, because text under one heading may cross reference or apply to text under one or more headings. Finally, in view of this disclosure, particular features described in relation to one aspect or embodiment may be applied to other disclosed aspects or embodiments of the invention, even though not specifically shown in the drawings or described in the text.

Although various embodiments have been described as having particular features and/or combinations of components, other embodiments are possible having a combination of any features and/or components from any of embodiments as discussed above. Aspects have been described in the general context of accessory support system, and more specifically a sprayer support system for landscaping equipment, but inventive aspects are not necessarily limited to use in landscaping equipment.

What is claimed is:

1. A support apparatus, comprising:
a first side support member having a first end portion and a second end portion, the first end portion of the first side support member including a first mounting portion configured to be coupled to a rollover protective structure of a landscaping equipment;
a second side support member having a first end portion and a second end portion, the first end portion of the second side support member including a second mounting portion configured to be coupled to the rollover protective structure;
a lateral support member coupled to the first side support member and the second side support member;
a platform member coupled onto one or more of the first side support member, the second side support member, or the lateral support member; and
a rotating support member including a first end portion and a second end portion, the first end portion of the rotating support member being rotatably coupled to the lateral support member, and the second end portion of the rotating support member configured to be removably coupled onto a portion of the rollover protective structure, the rotating support member being configured to transmit a load applied on the platform member to the rollover protective structure.

2. The support apparatus of claim 1, wherein the rotating support member includes an anchor member, the anchor member being coupled to the second end portion of the rotating support member.

3. The support apparatus of claim 2, wherein the anchor member includes a mounting face configured to brace against the portion of the rollover protective structure and at least partially surround the portion of the rollover protective structure.

4. The support apparatus of claim 2, wherein:
the first end portion of the rotating support member includes a pivot member,
the pivot member is perpendicular to a longitudinal axis of the rotating support member; and
the lateral support member includes a bushing within which the pivot member is rotatably supported.

5. The support apparatus of claim 4, further comprising:
a storage bracket coupled to the platform member, the storage bracket including a first bracket side and a second bracket side, the first bracket side defining a first bracket opening, the second bracket side defining a second bracket opening, the first bracket opening and the second bracket opening configured to receive an anchor pin;
the rotating support member being configured to rotate relative to the platform member between a storage position and an installed position, the anchor member configured to be removably coupled about the portion of the portion of the rollover protective structure via the anchor pin when the rotating support member is in the installed position; and
the second end portion of the rotating support member configured to be removably coupled between the first bracket side and the second bracket side via the anchor pin when the rotating support member is in the storage position, the second end portion.

6. The support apparatus of claim 1, wherein:
the first mounting portion is configured to be coupled to a first vertical support member of the rollover protective structure; and
the second mounting portion is configured to be coupled to a second vertical support member of the rollover protective structure.

7. The support apparatus of claim 6, wherein the first mounting portion is a sleeve member having a first pin opening extending through a center of the sleeve member, the first pin opening being configured to receive a mounting pin.

8. The support apparatus of claim 6, wherein the first mounting portion comprises:
a first mounting plate coupled to a first surface of a distal end of the first side support member; and
a second mounting plate coupled to a second surface of the distal end of the first side support member opposite of the first surface, wherein the first mounting plate and the second mounting plate define a pin opening configured to receive a mounting pin.

9. A support apparatus, comprising:
a first side support member having a first end portion and a second end portion, the first end portion of the first side support member including a first mounting portion configured to be inserted into a first hinge opening of a rollover protective structure of a landscaping equipment, the first mounting portion defining a first pin opening configured to receive a first mounting pin to secure the first mounting portion to the rollover protective structure;
a second side support member having a first end portion and a second end portion, the first end portion of the second side support member including a second mounting portion configured to be inserted into a second hinge opening of the rollover protective structure, the second mounting portion defining a second pin opening configured to receive a second mounting pin to secure the second mounting portion to the rollover protective structure; and
a platform member coupled onto one or more of the first side support member and the second side support member.

10. The support apparatus of claim 9, wherein:
the first mounting portion is a first tab member, the first tab member including an interior face facing the second mounting portion;
the second mounting portion is a second tab member, the second tab member including an interior face facing the first mounting portion; and
the interior face of the first tab member and the interior face of the second tab member are separated by a distance associated with the first hinge opening and the second hinge opening.

11. The support apparatus of claim 9, wherein the first mounting portion is a sleeve member and the first pin opening of the first mounting portion extends through a center of the sleeve member.

12. The support apparatus of claim 9, further comprising:
a second lateral support member coupled to the second end portion of the first side support member and the second end portion of the second side support member; and
a first lateral support member coupled to the first end portion of the first side support member and the first end portion of the second side support member.

13. A support apparatus, comprising:
a first side support member having a first end portion and a second end portion, the first end portion of the first side support member including a first mounting portion configured to be inserted into a first hinge opening of a rollover protective structure of a landscaping equipment, the first mounting portion defining a first pin opening configured to receive a first mounting pin to secure the first mounting portion to the rollover protective structure;
a second side support member having a first end portion and a second end portion, the first end portion of the second side support member including a second mounting portion configured to be inserted into a second hinge opening of the rollover protective structure, the second mounting portion defining a second pin opening configured to receive a second mounting pin to secure the second mounting portion to the rollover protective structure;
a lateral support member coupled to the first side support member and the second side support member; and
a rotating support member including a first end portion and a second end portion, the first end portion of the rotating support member being rotatably coupled to the lateral support member, and the second end portion of the rotating support member configured to be removably coupled onto a portion of the rollover protective structure, the rotating support member being configured to transmit a load to the rollover protective structure.

14. The support apparatus of claim 13, wherein the lateral support member is a second lateral support member, the support apparatus further comprising:
a first lateral support member coupled to the first side support member and the second side support member.

15. The support apparatus of claim 14, further comprising:
at least one cross support member extending from the first lateral support member and the second lateral support member.

16. The support apparatus of claim 14, wherein:
the first lateral support member is coupled to the first end portion of the first side support member and the first end portion of the second side support member; and
the second lateral support member is coupled to the second end portion of the first side support member and the second end portion of the second side support member.

17. The support apparatus of claim 16, further comprising:
a woven surface coupled to the first side support member and the second side support member, the woven surface being configured to support a load.

18. The support apparatus of claim 13, wherein:
the rotating support member includes an anchor member, the anchor member being coupled to the second end portion of the rotating support member; the anchor member including a mounting face configured to brace against the portion of the rollover protective structure and at least partially surround the portion of the rollover protective structure.

19. The support apparatus of claim 13, wherein:
the first mounting portion is a first tab member, the first tab member including an interior face facing the second mounting portion;
the second mounting portion is a second tab member, the second tab member including an interior face facing the first mounting portion; and
the interior face of the first tab member and the interior face of the second tab member are separated by a distance associated with the first hinge opening and the second hinge opening.

20. The support apparatus of claim 19, wherein:
the first tab member is removably coupled to the first side support member and is configured for mounting to the landscaping equipment; and
the second tab member is removably coupled to the second side support member and is configured for mounting to the landscaping equipment.

* * * * *